United States Patent [19]

Doyel

[11] 4,087,910
[45] May 9, 1978

[54] NUTCRACKER DEVICE

[76] Inventor: John S. Doyel, 404 W. 20th St., New York, N.Y. 10011

[21] Appl. No.: 758,674

[22] Filed: Jan. 12, 1977

[51] Int. Cl.² .............................................. A47J 43/26
[52] U.S. Cl. ..................................... 30/120.5; 99/577; 99/582
[58] Field of Search ................. 99/571, 573, 577, 578, 99/579, 581, 582, 583; 30/120.2, 277, 120.5; 241/168, 169

[56] References Cited

U.S. PATENT DOCUMENTS

| | | | |
|---|---|---|---|
| 2,543,886 | 3/1951 | Brookey | 30/120.5 |
| 2,695,642 | 11/1954 | White | 99/572 |
| 2,707,503 | 5/1955 | Johnson et al. | 99/579 X |
| 3,127,917 | 4/1964 | Turner | 99/583 X |
| 3,435,863 | 4/1969 | Dye | 99/583 |
| 3,496,975 | 2/1970 | Hill | 30/120.2 |
| 3,524,486 | 8/1970 | Turner | 99/571 |
| 3,841,212 | 10/1974 | Powell | 99/571 |

Primary Examiner—Philip R. Coe
Attorney, Agent, or Firm—Cooper, Dunham, Clark, Griffin & Moran

[57] ABSTRACT

A hand-operated device, in the form of a gun, shatters nut shells and the like. The gun has an inertia weight and a limited movement hammer bolt between which a nut shell is inserted and held in place by pressure applied on a trigger against a pistol grip. A striker rod is moved against the biasing action of a spring to permit the pressure applied on the trigger to move the inertia weight and the hammer bolt forwardly by a distance corresponding to the extent of the limited movement of the hammer bolt. The striker rod is released to move under the biasing action of the spring and strike the hammer bolt, and the hammer bolt in turn strikes against the nut shell, which is backed up primarily by the inertia of the inertia weight but also partly by the pressure on the trigger to impact and shatter the nut shell.

5 Claims, 9 Drawing Figures

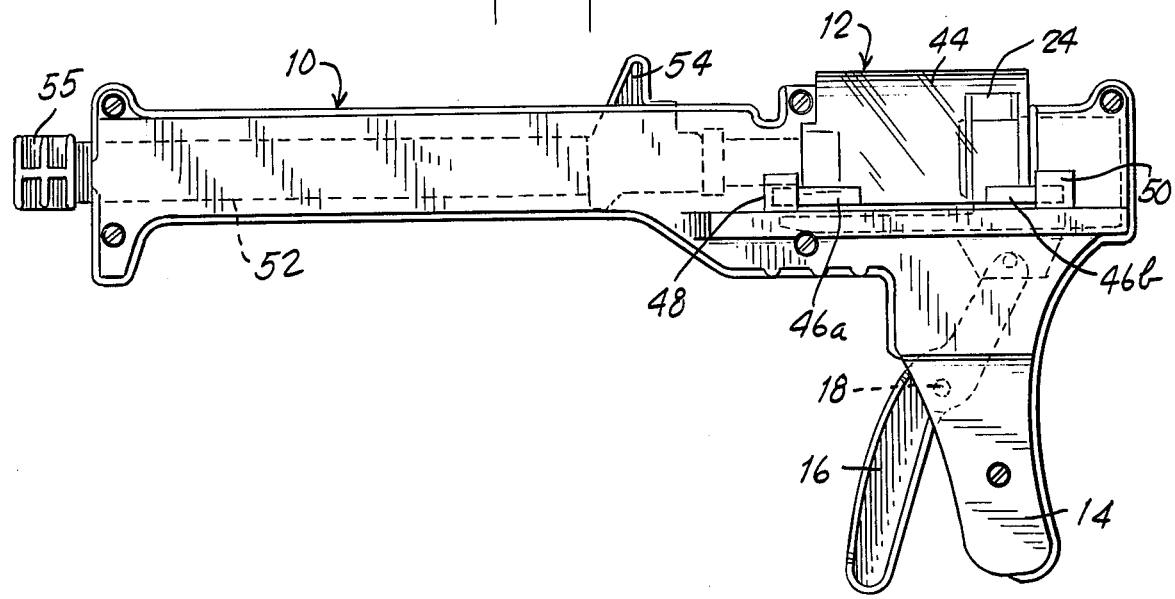
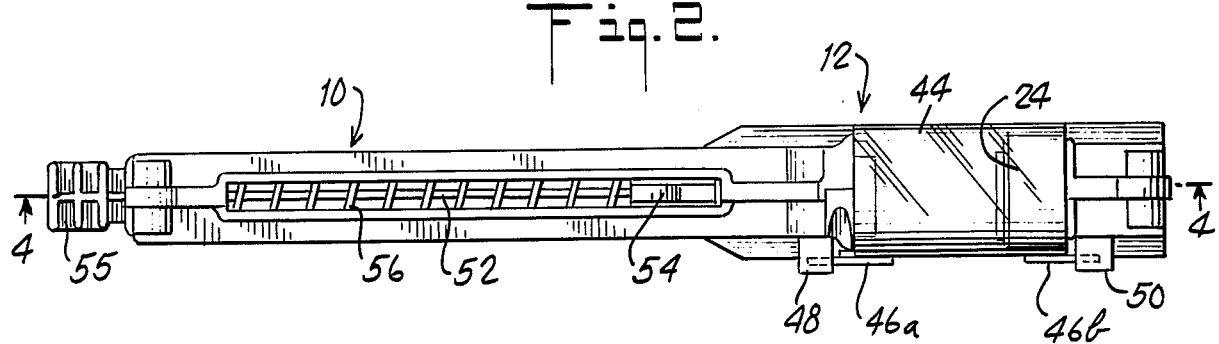
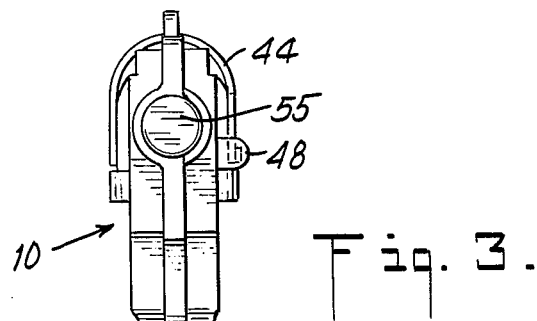

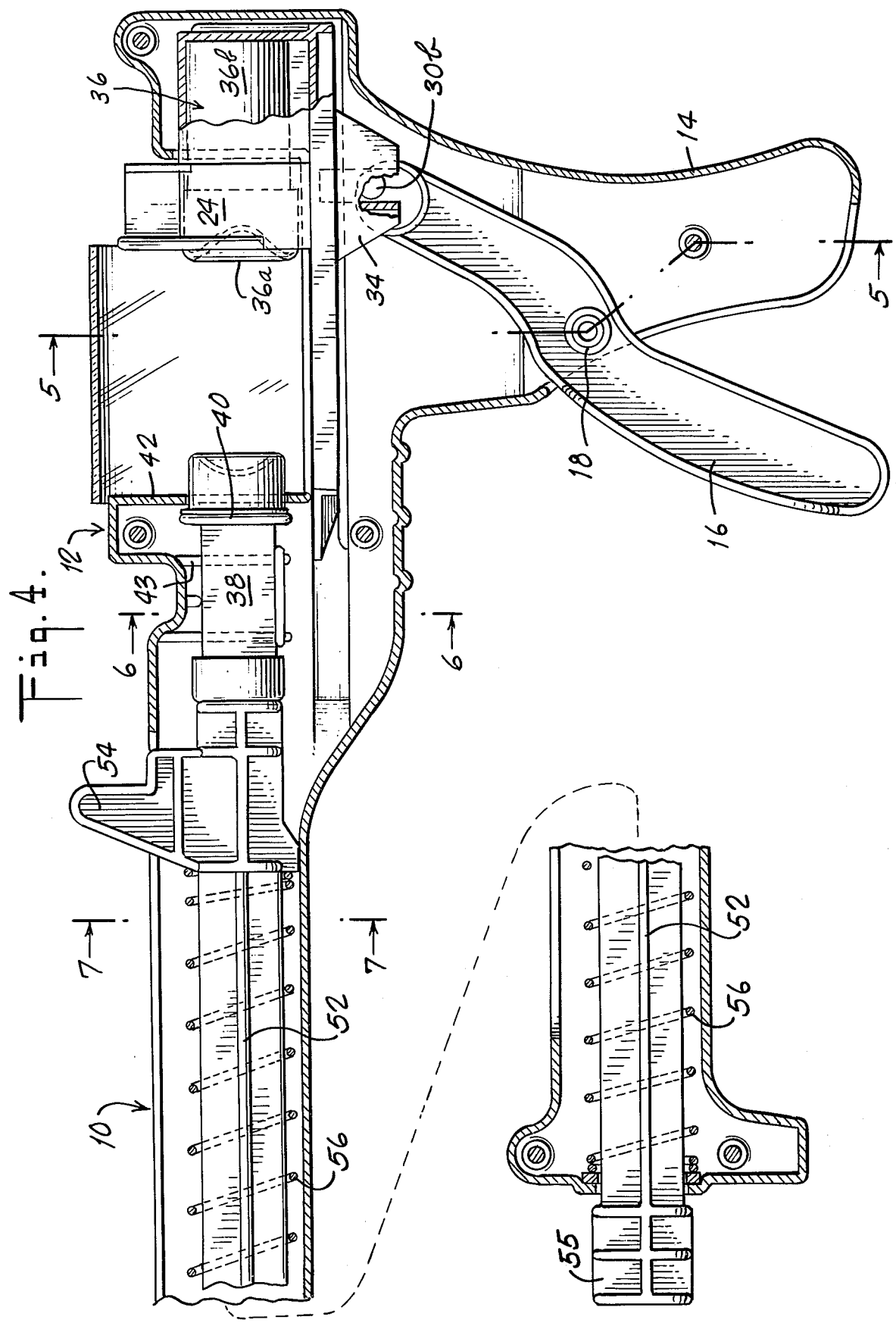

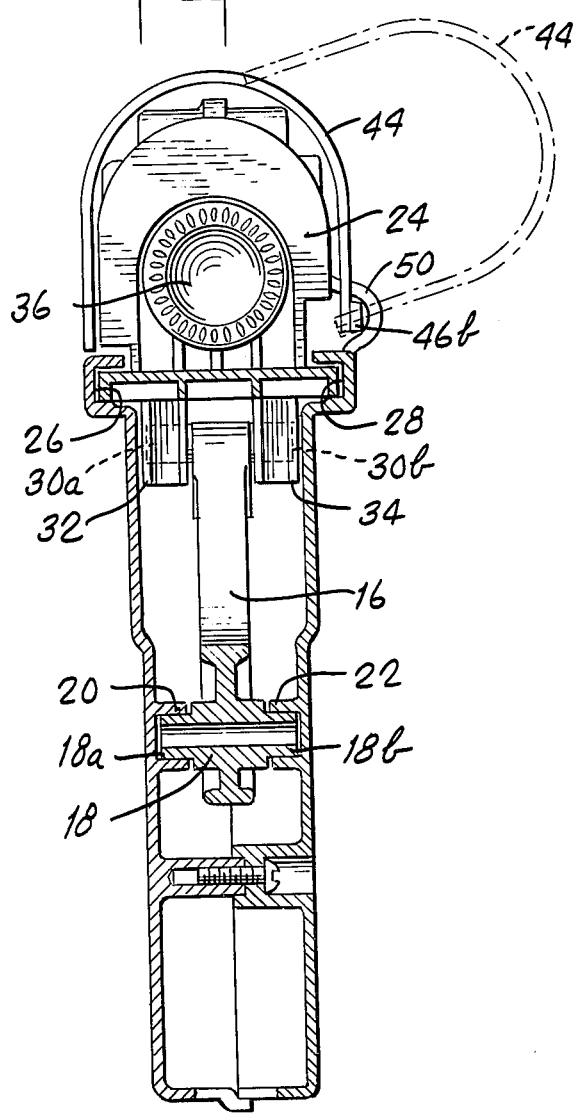
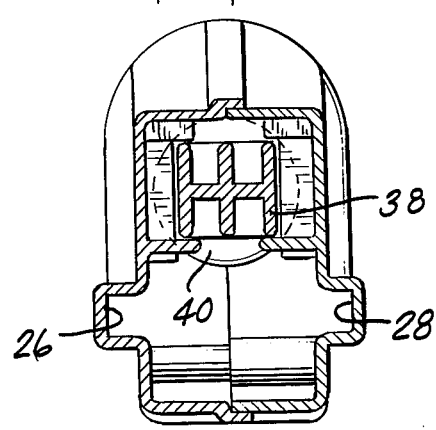
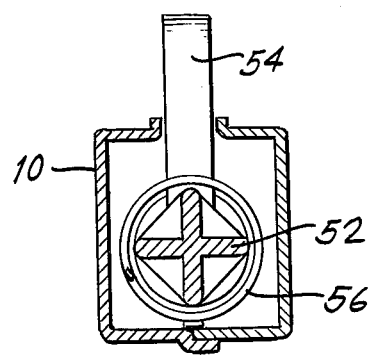
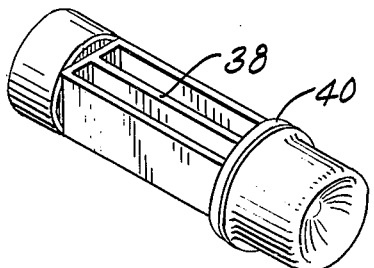
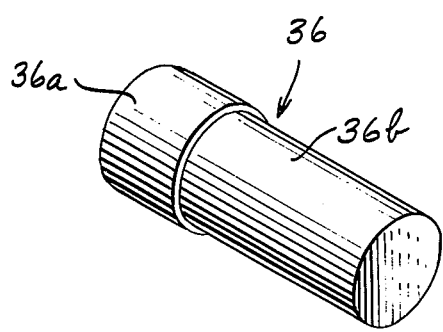

NUTCRACKER DEVICE

BACKGROUND AND SUMMARY OF THE INVENTION

The invention is in the field of devices which shatter rather than crush nut shells and the like. It is particularly concerned with a portable hand-operated device for doing this efficiently and inexpensively.

There are various prior art devices for shattering rather than cracking nut shells. Examples are described in Turner, U.S. Pat. Nos. 3,127,917 and 3,524,486; Dye, U.S. Pat. No. 3,435,863, and a device of this type is made by R. P. Industries of Raleigh, North Carolina under the name of TEXAS NATIVE NUT-CRACKER. These prior art devices typically have a suitable base on which two nut gripping members, one or both of which may be guided for movement on said base, and an impact member are disposed. A nut shell engaged between the two nut gripping members may be suddenly impacted and shattered by the force of the impact member transmitted through the movement of the nut gripping members. To avoid crushing the meat of the nut, these prior art devices allow only a limited stroke of either the impact member or one of the nut gripping members. Various type safety shields to confine shattered shell fragments from scattering in all directions may be provided. While oftlen quite useful, such prior art devices may not have sufficient versatility, low cost or ease of use in certain cases. For example, the prior art devices known to applicant are used while either resting on or anchored to a supporting surface, i.e., such as a table top, which limits their choice of location and makes them less portable and convenient to move from place to place. Moreover, to maximize the force of the moving impact member which is transmitted to the nut shell through the nut gripping members, at least one of the nut gripping members is made quite heavy, so as to have higher inertia, which further limits the portability of these devices. In addition, those prior art devices operating in a generally horizontal plane require that the nut gripping members and the nut shell be held in an operative position concurrently while the impact member is cocked in readiness for an operative stroke. This may make these prior art devices awkward and difficult to use.

In view of this prior art, there is a need for a nut cracking device which is highly portable and lightweight and can be used on a horizontal or an inclined surface, i.e., such as a table or counter top, but can be used as a handheld device without the need for any supportive surface. Such device should be convenient to use and should be inexpensive to make. This invention is directed to providing a device meeting such needs.

One specific embodiment of the invention is a device which comprises an elongated gun-like body. The gun body includes a barrel, a breech and a pistol grip. A trigger is mounted at the piston grip for movement toward and away from the grip. A loading carriage is mounted on the breech of the gun body for movement along the barrel axis. The trigger is connected to the loading carriage to move the carriage forwardly toward the barrel with the movement of the trigger toward the pistol grip. An inertia weight, having a forward end shaped to engage a nut shell, is mounted on the loading carriage to move therewith along the barrel axis. The mass of the inertia weight is substantially less than that of the inertia weights used in the prior art devices known to applicant. A hammer bolt, having a back end facing and aligned with the forward end of the inertia weight, and also being shaped to engage a nut shell, is mounted at the back end of the barrel for limited movement along the barrel axis. A safety shield is mounted at the breech. When in its operative position the shield encloses the facing ends of the inertia weight and hammer bolt and the nut shell to prevent shell fragments from scattering after impact of the nut shell and to contain the shell fragments so as to minimize clean up. A striker rod, having an upwardly projecting grip at its rear and a frontally projecting pull at its front, extends along the barrel. A spring extends along the length of the rod. The spring in its most extended position biases the rod toward the back end of the barrel, the rod thereby maintaining the hammer bolt in its biased position, i.e., the backmost position of its limited movement along the barrel axis. The rod moves by either grasping and moving the grip toward the front of the barrel or grasping and moving the pull away from the front of the barrel, and is guided by the barrel for movement along the barrel axis against the biasing action of the spring.

In operation, the device may either be supported on a horizontal or an inclined surface or may be used without any supporting surface, i.e., by being hand-held. The operation in either case is substantially the same. The hinged safety shield is moved from its operative position to permit insertion of a nut shell in the breech of the device. The loading carriage is moved rearwardly to permit insertion of the nut shell between the facing ends of the inertia weight and the hammer bolt. The nut shell is held in position by moderate pressure on the trigger agaiłnt the pistol grip. The trigger arrangement permits a much lighter inertia weight to be used when compared to previous devices of this type known to applicant and consequently a much lighter and more inexpensive device is possible. The hinged safety shield is closed to its operative position to enclose the facing ends of the inertia weight and hammer bolt and the nut shell so as to contain the shattering shell within the device. By grasping the extending upwardly projecting grip or the frontally projecting pull of the striker rod, the user moves the rod forwardly against the biasing action of the spring, and concurrently lightly squeezes the trigger to move the inertia weight, the carriage, the hammer bolt and the nut shell forwardly along the barrel axis by a distance corresponding to the extent of the limited movement of the hammer bolt. The user then releases the striker rod to permit a back stroke of the rod under the rearwardly biasing action of the spring. The striker rod strikes the hammer bolt; the hammer bolt, in turn, strikes the nut shell, and shatters the nut shell. Because of the limited movement of the hammer bolt and because of the inertia weight and the trigger arrangement, the nut meat is not crushed.

BRIEF DESCRIPTION OF THE DRAWINGS

FIG. 1 is a side view of a nutcracker device in accordance with the invention.

FIG. 2 is a top view thereof.

FIG. 3 is a front view thereof.

FIG. 4 is a sectional view taken along 4—4 of FIG. 2.

FIG. 5 is a sectional view taken along 5—5 of FIG. 4.

FIG. 6 is a partial sectional view taken along 6—6 of FIG. 4.

FIG. 7 is a partial sectional view taken along 7—7 of FIG. 4.

FIG. 8 is a perspective view of a hammer bolt forming a part of the nutcracker device of FIG. 1.

FIG. 9 is a perspective view of an inertia weight forming a part of the nutcracker device of FIG. 1.

DETAILED DESCRIPTION

Referring to FIGS. 1, 2, 3 and 4, a hand-operated device for shattering rather than cracking nut shells comprises an elongated gun-like body having a barrel 10, a breech 12 and a pistol grip 14. A trigger 16 is mounted at the pistol grip 14 for movement of its bottom end toward and away from the grip 14. As best seen in FIGS. 4 and 5, the trigger 16 has pegs 18a and 18b journaled at supports 20 and 22 integral with the pistol grip 14 to permit pivoting movment of the bottom end of the trigger 16 toward and away from the grip 14. A loading carriage 24 is mounted at the breech 12 of the gun body for movement along the barrel axis 10. The carriage 24 slides forwardly and rearwardly, in channels 26 and 28 (FIGS. 5 and 6) along the axis of barrel 10. The upper end of trigger 16 engages the loading carriage 24 to move the carriage 24 forwardly toward the barrel 10 with the movement of the bottom end of the trigger 16 toward the pistol grip 14. The top portion of the trigger 16 (FIG. 5) has pegs 30a and 30b journaled at supports 32 and 34 integral with the carriage 24 to slide the carriage along the axis of barrel 10.

An inertia weight 36 (FIGS. 4, 5 and 9), generally of cylindrical shape (FIG. 9) and having a forward socket shaped end with serrations on its outside circumference, is mounted on the loading carriage 24 to move therewith along the axis of barrel 10. Because of the particular arrangement of the device described here, the mass of the inertia weight 36 can be substantially less than that of inertia weights used in prior devices of the type known to applicant and thus may be made more inexpensively. Moreover, the inertia weight 36 comprises a piece 36b cut straight from inexpensive metal bar stock and a frictionally fitted stamped metal cap 36a, with the serrations on the cap and the socket shape of it being formed in the stamping process. This obviates any need to machine the inertia weight and further reduces the cost of the device. A hammer bolt 38 (FIGS. 4, 6 and 8), having a back end facing and aligned with the forward end of the inertia weight 36, is mounted at the back end of the barrel 10 for limited movement along its axis. The hammer bolt 38, generally of cylindrical shape (FIG. 8), has a middle portion that may be made of lightweight material such as plastic, and ends that may be made of a material such as a lightweight steel, so as to be substantially lighter than the inertia weight 36 and thus may be made more inexpensively. In addition, the use of a plastic material partially cushions the impact when the nut shell is struck. The back end of the bolt 38 is socket-shaped to engage a nut shell. Flanges 42 and 43, which are integral with and extend laterally from the breech 12, limit the axial movement of a collar 40 on the bolt 38 to a selected range. The spacing between flanges 42 and 43 thus determines the length of the stroke of the bolt 38. A safety shield 44 is mounted at the breech 12, and when in its operative position encloses the facing ends of the inertia weight 36, hammer bolt 38 and the nut shell to prevent shell fragments from scattering and to contain the shell fragments so as to minimize clean up. The safety shield 44 has semicircular cross-section and pegs 46a and 46b journaled at supports 48 and 50 integral with the breech 12 to permit hinged movement of the shield 44 to an open position to permit a nut shell to be placed by the user between the inertia weight 36 and the hammer 38.

A striker rod 52, having an upwardly projecting grip 54 at its rear and a frontally projecting pull 55 at its front, extends along the length of the barrel 10. A spring 56 extends along the length of the rod 52. One end of the spring 56 rests against the grip 54 while the other end rests against the forward end of the barrel 10. The spring 56 in its most extended position biases the rod 52 against the back end of the barrel 10, the rod 52 thereby maintaining the hammer bolt 38 in its biased position, i.e., the back-most position of its limited movement along the barrel 10, with its collar 40 abutting against the flange 42 (FIG. 4). The rod 52 is moved by the user toward the front of the barrel 10 by grasping either the grip 54 or the pull 55, and is guided by the barrel 10 for movement along its axis against the biasing action of the spring 56.

In operation, the device may either be supported on a surface or may be used without a supporting surface, i.e., by being hand-held. The operation in either case is substantially the same. The hinged safety shield 44 is opened, and the loading carriage 24 is moved rearwardly, by moving the bottom end of the trigger 16 away from the piston grip 14, to permit insertion of a nut shell lengthwise between the facing ends of the inertia weight 36 and the hammer bolt 38. Some nuts with comparatively tougher shells, e.g., almonds or Brazil nuts, may be inserted sideways and tightly gripped on one side by the sharp serrated edges of the inertia weight 36. The nut shell is then held in position by moderate pressure on the bottom part of the trigger 16 against the pistol grip 14. The trigger 16 and the loading carriage 24 are arranged to permit a much lighter inertia weight 36 to be used when compared to previous devices of this type known to applicant and consequently a much lighter and therefore a more inexpensive device is possible. The hinged safety shield 44 is closed to enclose the facing ends of the inertia weight 36 and hammer bolt 38 and the nut shell so as to contain the shell fragments within the enclosure. Further, the bottom of the loading carriage 24 extends beyond the facing ends of the inertia weight 36 and hammer bolt 38 so that shell fragments may not become lodged in the device and thus maintenance of the device is minimized. By grasping the grip 54 or the pull 55, the user moves the striker rod 52 fowardly against the biasing action of the spring 56, and thereby permits the pressure on the bottom part of the trigger 16 to move the inertia weight 36, the carriage 24, and the hammer bolt 38 forwardly along the axis of the barrel 10 by a distance corresponding to the extent of the limited movement of the collar 40 on the hammer bolt 38.

When the user releases the striker rod 52, the rod accelerates rearwardly under the biasing action of the spring 56. The striker rod 52 strikes the hammer bolt 38; the hammer bolt 38, in turn, strikes the nut shell and shatters it.

I claim:

1. A hand-operated device for shattering rather than crushing nut shells comprising:
   an elongated gun-like body having a barrel, a breech, and a pistol grip;
   a trigger mounted at the pistol grip for movement toward and away from the grip and a loading carriage mounted at the breech for movement along the barrel axis, said trigger being connected to the loading carriage to move the carriage forwardly with movement of the trigger toward the pistol grip and said carriage being free to move backwardly with movement of the trigger away from the pistol grip;

an inertia weight mounted at the carriage to move therewith along the barrel axis, said inertia weight having a forward end shaped to engage a nut shell;

a hammer bolt mounted at the back end of the barrel for limited movement along the barrel axis, said hammer bolt having a back end facing and aligned with the forward end of the inertia weight and being shaped to engage a nut shell;

a striker rod extending along the barrel and guided thereby for movement along the barrel axis;

means for biasing the striker rod toward the back end of the barrel, said rod engaging the hammer bolt in its biased position to maintain the hammer bolt in the backmost position of its limited movement along the barrel axis; and means for moving the striker rod against the biasing means to engage a nut shell between the facing ends of the inertia weight and the hammer bolt, said nut shell being held between said facing ends of the weight and the bolt by moderate pressure of the trigger against the pistol grip, and to move the striker rod, the hammer bolt and the inertia weight forwardly against the biasing means to the extent of the limited movement of the hammer bolt, said striker rod being moveable manually further forwardly against the biasing means and when released carrying out a back stroke under the action of the biasing means, said rod in its back stroke striking the hammer bolt and the hammer bolt in turn striking the nut shell to impact and shatter said nut shell, said nut shell being backed up both by the inertia of the inertia weight and by said moderate pressure on the trigger.

2. A device as in claim 1, including a shield movable between an operative position in which it encloses the nut shell and the facing ends of the inertia weight and the hammer bolt to contain the nut shell during and after shattering and an open position to permit removal of the shattered shell and the nut meat and placing of a new shell between the hammer bolt and the inertia weight.

3. A device as in claim 1, wherein the means for biasing the striker rod comprises a compression coil spring.

4. A device as in claim 1, wherein the hammer bolt comprises a plastic body capped with metal at least at its back end.

5. A device as in claim 1 wherein the inertia weight comprises a bar stock piece and a stamped metal cap fitted over the forward end of the bar stock piece, said cap having at its forward face a stamped depression and a stamp-serrated rim surrounding the depression, said depression and serrated rim forming said shaped forward end of the inertia weight.

* * * * *